UNITED STATES PATENT OFFICE.

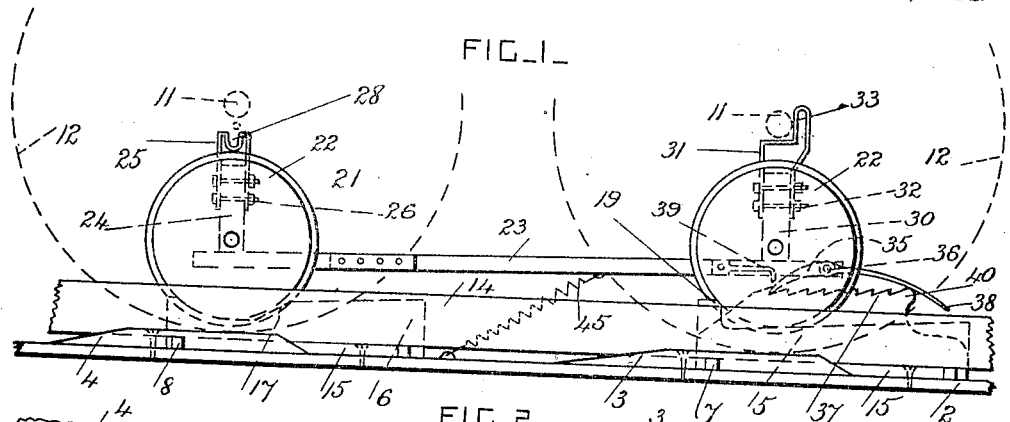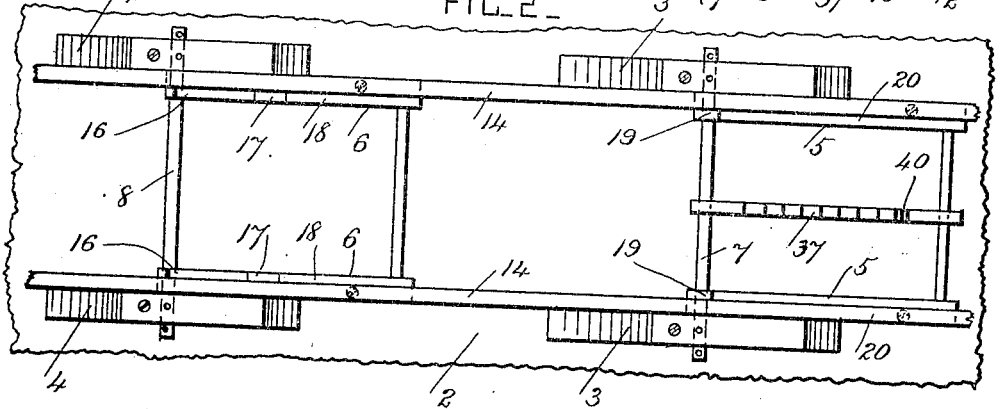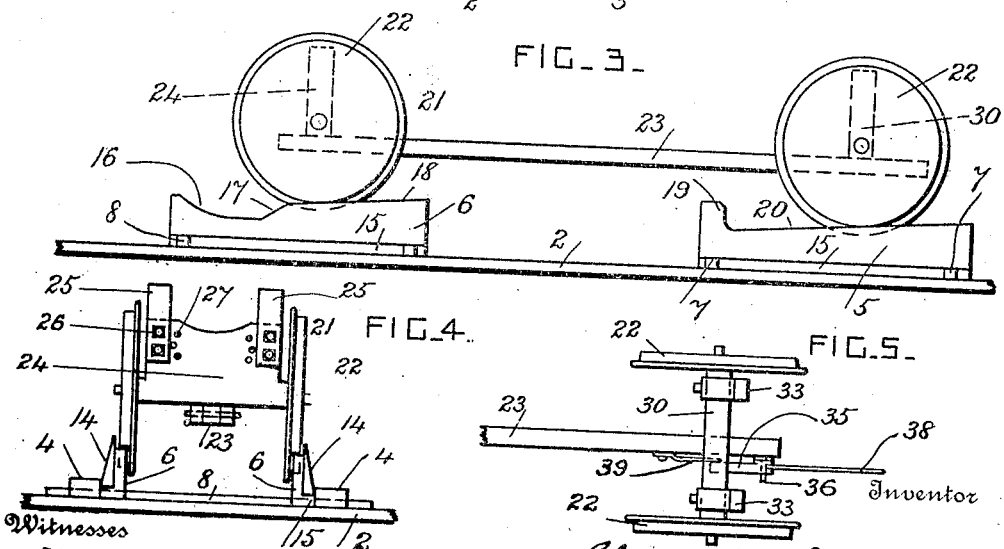

CHARLES W. SCHUBERT, OF COTTONWOOD, IOWA.

SUPPORT FOR MOTOR-CARS.

1,099,471. Specification of Letters Patent. Patented June 9, 1914.

Application filed December 7, 1912. Serial No. 735,418.

*To all whom it may concern:*

Be it known that I, CHARLES W. SCHUBERT, a citizen of the United States, residing at Cottonwood, in the county of Lee and State of Iowa, have invented certain new and useful Improvements in Supports for Motor-Cars; and I do hereby declare the following to be a full, clear, and exact description of the invention, such as will enable others skilled in the art to which it appertains to make and use the same.

This invention relates to means for supporting motor cars with the pneumatic tires of their wheels raised above the ground or floor; and it consists of a wheeled truck which runs on guide rails arranged adjacent to inclined planes as hereinafter fully described and claimed.

In the drawings, Figure 1 is a side view of the support showing the truck in a position to receive a motor car. Fig. 2 is a plan view of the inclined planes and guide rails. Fig. 3 is a side view of two guide rails showing the truck wheel moved forwardly. Fig. 4 is a rear view of the truck. Fig. 5 is a plan view of the front end portion of the truck.

A flat support 2 is provided, such as the floor of a garage or it may be the ground. Two pairs of inclined planes 3 and 4 are provided, and two pairs of guide rails 5 and 6. The front inclined planes 3 and the front guide rails 5 are coupled together by one or more crosspieces 7, and the inclined planes are adjustable laterally on the crosspieces so that they may be set at different distances apart.

The rear inclined planes and the rear guide rails 6 are coupled together in a similar manner by one or more cross-pieces 8. The two sections of the inclined planes and their guide rails can be set at different distances apart longitudinally to adapt them to road wheels of different motor cars, and the lateral adjustment of the inclined planes enables cars of different width to be run onto them. The dotted lines 11 and 12 in Fig. 1 indicate respectively the axles and road wheels of a motor car.

The inclined planes and the guide rails can be secured to the support or floor 2 in any approved manner, and 14 are longitudinal bars, triangular in cross-section, for holding the inclined planes and guide rails in alinement. The tops of the bars 14 project a little above the guide rails, and these bars guide the motor car wheels between the rail sections. The guide rails have flanges 15 which extend under the bars 14 and abut against the adjacent inclined planes.

The rear guide rails 6 are provided with circular segmental recesses 16 at their rear end portions. They have also steep inclined portions 17 in front of the recesses, and gently inclined portions 18 in front of the parts 17. The front guide rails 5 have stops 19 at their rear ends, and gently inclined portions 20 in front of the stops. All the inclined portions and the inclined planes are inclined upwardly from rear to front, and the inclined planes 3 and 4 have flat top portions of any desired length.

The truck 21 is provided with wheels 22 which run upon the guide rails. A reach 23 extends between the axles or bolsters of the front and rear truck wheels, and is adjustable in length in any approved way, so that the front and rear wheels can be set at different distances apart longitudinally. The rear bolster 24 is provided with two forked metallic brackets 25 which straddle it, and which are adjustable both vertically and laterally upon it.

Fastening bolts 26 are provided for securing the brackets to the bolster, and the bolster has a plurality of bolt holes or slots 27 to enable the brackets to be adjusted to suit the axles of different motor cars. The tops of the brackets 25 have notches or grooves 28 to receive the usual truss-rods under the rear axle of a motor car, when the rear motor car axle rests on top of the brackets 25.

The front bolster 30 is provided with two forked brackets 31 which straddle it, and which are secured to it by bolts 32, in a similar manner to the rear brackets, and which are also adjustable both vertically and laterally. The brackets 31 have projections 33 at their rear sides for the front axle of the motor car to engage with when it is over the tops of the brackets.

A pawl or lever 35 is pivoted to the front end portion of the reach by a pin 36, and normally engages by gravity with the teeth of a rack or ratchet bar 37, which is secured to the front crosspieces between the front guide rails. The front end of this pawl forms an operating handle 38 which projects at the front end of the truck and which is curved downwardly. A spring catch 39 is arranged between the pawl and the reach, and when the pawl is raised clear of the teeth of the rack, by depressing the handle 38, the catch holds it in its raised position. A tappet 40 is formed on the front end of the rack, and when the truck runs rearwardly this tappet 40 strikes the curved handle 30 and places the pawl in engagement with the toothed rack, by overpowering the frictional resistance of the spring catch 39.

A check spring 45 is connected to the truck and to any stationary part, to prevent the truck from running too far forward, but this spring may be dispensed with, or any other form of spring or buffer may be used.

When the rear wheels of the truck are in the recesses 16, and the front wheels are against the stops 19, the tops of the rear brackets 25 are below the level of the tops of the front brackets, and the axles of the motor car can pass over them. When the front axle of the motor car strikes against the projections 33, as shown in Fig. 1, the axles are directly over the respective brackets, and the road wheels of the motor car have been run up the inclined planes. The continued forward motion of the motor car along the flat tops of the inclined planes moves the truck forwardly. The rear truck wheels ascend the steep inclined portions 17 of the guide rails, so that the rear brackets are raised into engagement with the rear axle of the motor car, and the weight of the motor car is then taken by the wheeled truck, the wheels of which run up the gently inclined rear end portions of the guide rails until the road wheels of the motor car are clear of the inclined planes.

When the motor car is supported in this manner the pneumatic tires of its road wheels are relieved of its weight, and do not become deflated or otherwise injured.

What I claim is:

1. The combination, with a support, of inclined planes and guide rails arranged in front and rear sections on the support, longitudinal bars extending between the front and rear sections and adapted to guide the motor car between the front and rear inclined planes, and a wheeled truck which runs on the front and rear sections of the guide rails and supports the motor car.

2. The combination, with a support, of inclined planes and guide rails secured together in separate front and rear sections, one section being adjustable longitudinally of the other section upon the said support and the inclined planes being spaced to engage with the road wheels of a motor car, longitudinal bars secured against the guide rails, for guiding the motor car and holding the guide rails in alinement, and a truck, for supporting the motor car, having wheels which run on the said guide rails.

3. The combination, with inclined guide rails, and a wheeled truck which runs on the guide rails and supports a motor car; of means for normally preventing the truck from moving backwardly on the rails, a device for holding the said means in an inoperative position to permit the truck to move backwardly at will, and means for automatically restoring the aforesaid means to its normal operative position when the truck reaches the extremity of its backward movement.

4. In a device of the character described, the combination of a lower frame, inclines mounted on the front and rear of said frame, the lower part of said rear inclines being cut at a greater angle than the upper part, an upper frame on which a vehicle is adapted to rest, said frame being movable up said inclines by reason of the momentum of the vehicle.

5. In a device of the character described, the combination of a lower frame, inclines mounted on the front and rear of said frame, the lower part of said rear inclines being cut at a greater angle than the upper part, an upper frame on which a vehicle is adapted to rest, said frame being movable up said inclines by reason of the momentum of the vehicle, axle-engaging members carried by the said upper frame, slots being provided in the members that engage the rear axle of the vehicle, whereby said rear axle is engaged by said members at the same time that the other axle-engaging members come into lifting contact with the front axle.

6. In a device of the character described, the combination of a lower frame provided at its rear end with cut-out portions or rests, inclines mounted on the front and rear of said frame, an upper frame on which a vehicle is adapted to rest, rollers provided on the front and rear of said upper frame and adapted to engage said inclines, the rear rollers normally engaging said cut-out portions and thus being supported on a lower level than the front rollers.

7. In a device of the character described, the combination of a lower frame provided at its rear end with cut-out portions or rests, inclines mounted on the front and rear of said frame, the lower parts of said rear inclines being cut at a greater angle than the upper parts and being immediately adjacent to said cut-out portions or rests, an upper frame on which a vehicle is adapted to rest, rollers provided on the front and rear of said upper frame and adapted to engage said inclines, the rear rollers normally engaging said cut-out portions and thus being supported on a lower level than the front rollers.

8. The combination, with a support, of inclined planes spaced to engage with the road wheels of a motor car, front guide rails and rear guide rails each having gently inclined surfaces and the rear guide rails having also steeply inclined surfaces at their rear end portions, and a truck provided with means for engaging with the axles of a motor car and having wheels which run on the said guide rails, the rear part of the truck being raised rapidly to engage with the rear axle of the motor car when the motor car and truck move forward together.

9. The combination, with a support, and inclined planes; of guide rails arranged on the support in front and rear sections, all the guide rails having similar gently inclined surfaces and the rear guide rails having also steeply inclined surfaces at their rear end portions, and a wheeled truck for supporting a motor car, said truck being arranged clear of the front axle of the motor car when the truck is in its rearward position and having its rear end portion raised by the steeply inclined surfaces when the truck is moved forwardly to run on the gently inclined surfaces.

In testimony whereof I have affixed my signature in the presence of two witnesses.

CHARLES W. SCHUBERT.

Witnesses:
  LENA SCHUBERT,
  ELLEN LAWSON.